United States Patent
Larsson et al.

(10) Patent No.: US 12,024,022 B2
(45) Date of Patent: Jul. 2, 2024

(54) HYBRID POWERTRAIN FOR A VEHICLE

(71) Applicant: Ningbo Geely Automobile Research & Development Co., Ltd., Ningbo (CN)

(72) Inventors: Johannes Larsson, Gothenburg (SE); Shabbir Adil, Hisings Backa (SE); Hans Enström, Lerum (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 0 days.

(21) Appl. No.: 17/690,895

(22) Filed: Mar. 9, 2022

(65) Prior Publication Data
US 2022/0194206 A1 Jun. 23, 2022

Related U.S. Application Data

(63) Continuation of application No. PCT/CN2020/115449, filed on Sep. 16, 2020.

(30) Foreign Application Priority Data

Sep. 17, 2019 (EP) ..................................... 19197692

(51) Int. Cl.
*B60K 6/40* (2007.10)
*B60K 6/365* (2007.10)
(Continued)

(52) U.S. Cl.
CPC ................ *B60K 6/40* (2013.01); *B60K 6/365* (2013.01); *B60K 6/387* (2013.01); *B60K 6/442* (2013.01); *B60K 6/50* (2013.01); *B60Y 2200/92* (2013.01)

(58) Field of Classification Search
CPC ....... F16H 37/0813; B60K 6/40; B60K 6/365; B60K 6/387; B60K 6/442; B60K 6/50
(Continued)

(56) References Cited

U.S. PATENT DOCUMENTS 6,319,168 B1 11/2001 Morris et al.
8,727,939 B2 * 5/2014 Chen ........................ B60K 6/54
74/329

(Continued)

FOREIGN PATENT DOCUMENTS

CN 1420034 A 5/2003
CN 102166947 A 8/2011
(Continued)

OTHER PUBLICATIONS

English translation of DE102016220511A1; http://translationportal.epo.org; Mar. 9, 2023 (Year: 2023).*
(Continued)

*Primary Examiner* — Roger L Pang
(74) *Attorney, Agent, or Firm* — Tucker Ellis LLP

(57) ABSTRACT

A hybrid powertrain for a vehicle includes an internal combustion engine having a crank shaft rotatable about a geometric axis, an electric machine and a transmission having an input shaft rotatable about the geometric axis, and a clutch by which clutch the internal combustion engine and the transmission are selectively connectable to each other. A rotor of the electric machine is arranged on the crank shaft for rotating together with the crank shaft about the geometric axis, and the clutch is a dog clutch arranged for connecting and disconnecting the crank shaft of the internal combustion engine and the input shaft of the transmission to and from each other.

8 Claims, 3 Drawing Sheets

(51) Int. Cl.
  *B60K 6/387* (2007.10)
  *B60K 6/442* (2007.10)
  *B60K 6/50* (2007.10)

(58) Field of Classification Search
  USPC .................. 475/5, 200, 206; 180/65.235
  See application file for complete search history.

(56) References Cited

U.S. PATENT DOCUMENTS

| | | | |
|---|---|---|---|
| 11,214,242 B2* | 1/2022 | Lehmann | ............... B60K 6/36 |
| 2003/0078134 A1 | 4/2003 | Kojima et al. | |
| 2004/0204286 A1 | 10/2004 | Tridsberg | |
| 2007/0072723 A1 | 3/2007 | Klemen et al. | |
| 2007/0254764 A1 | 11/2007 | Shibata et al. | |
| 2009/0321170 A1 | 12/2009 | Guo | |
| 2013/0289810 A1 | 10/2013 | Holmes et al. | |
| 2014/0080650 A1* | 3/2014 | Ruhle | ............... B60K 6/442 |
| | | | 475/5 |
| 2014/0243149 A1 | 8/2014 | Holmes et al. | |
| 2015/0111694 A1* | 4/2015 | Kim | ............... B60K 6/442 |
| | | | 903/902 |
| 2016/0097430 A1 | 4/2016 | Imafuku et al. | |
| 2020/0238815 A1* | 7/2020 | Yuan | ............... F02N 11/0814 |

FOREIGN PATENT DOCUMENTS

| | | | | |
|---|---|---|---|---|
| CN | 102310756 A | | 1/2012 | |
| CN | 202782641 U | | 3/2013 | |
| CN | 107521326 A | | 12/2017 | |
| DE | 102007004464 A1 | | 7/2008 | |
| DE | 102011005451 A1 | | 9/2012 | |
| DE | 102016220511 A1 | * | 4/2018 | ............... B60K 6/24 |
| DE | 102018103156 A1 | | 8/2019 | |
| EP | 2225120 B1 | | 9/2010 | |
| EP | 3315372 A1 | | 5/2018 | |
| FR | 2809352 A1 | | 11/2001 | |
| FR | 2839023 A1 | * | 10/2003 | ............... B60K 6/365 |
| FR | 2839023 A1 | | 10/2003 | |
| JP | 2001113967 A | | 4/2001 | |
| WO | 2008075760 A1 | | 6/2008 | |
| WO | WO-2018137421 A1 | * | 8/2018 | ............... B60K 1/02 |

OTHER PUBLICATIONS

English translation of WO2018137421A1; http://translationportal.epo.org; Nov. 30, 2023 (Year: 2023).*
International Search Report from corresponding International Application No. PCT/CN2020/115449, mailed on Nov. 13, 2020, 2 pages.

* cited by examiner

HYBRID POWERTRAIN FOR A VEHICLE

RELATED APPLICATION DATA

This application is a continuation of International Patent Application No. PCT/CN2020/115449, filed Sep. 16, 2020, which claims the benefit of European Patent Application No. 19197692.7, filed Sep. 17, 2019, the disclosures of which are incorporated herein by reference in their entireties.

TECHNICAL FIELD

The invention relates to a hybrid powertrain for a vehicle, which powertrain comprises an internal combustion engine having a crank shaft rotatable about a geometric axis, an electric machine and a transmission having an input shaft rotatable about the geometric axis, and a clutch by which clutch the internal combustion engine and the transmission are selectively connectable to each other.

BACKGROUND

For a vehicle with a hybrid powertrain where an internal combustion engine and one or more electric motors are connected to a transmission for transmitting torque to wheels of the vehicle, the powertrain can be designed in many ways for achieving the requisite gears and functions.

There are however boundary conditions with respect to costs, weight and available space at the same time as it should be possible to use both the internal combustion engine and the electric motors in an efficient way.

SUMMARY

An objective of the invention is to provide a hybrid powertrain having an improved efficiency.

The objective is achieved by a hybrid powertrain for a vehicle, wherein the powertrain comprises an internal combustion engine having a crank shaft rotatable about a geometric axis, an electric machine and a transmission having an input shaft rotatable about the geometric axis, and a clutch by which clutch the internal combustion engine and the transmission are selectively connectable to each other, and wherein a rotor of the electric machine is arranged on the crank shaft for rotating together with the crank shaft about the geometric axis, and the clutch is a dog clutch arranged for connecting and disconnecting the crank shaft of the internal combustion engine and the input shaft of the transmission to and from each other.

The invention is based on the insight that by such a powertrain the number of friction components can be reduced at the same time as a compact design is achieved. By the use of the dog clutch not involving clutch slip which is associated with friction clutches, losses and wear can be reduced.

The term "dog clutch" is meant to cover coupling elements that couple two rotating components not by friction but interference.

The electric machine can be an electric motor or a combined electric motor and generator. Preferably the electric machine is connected to an energy storage for transferring energy between the electric machine and the energy storage.

The expression "a rotor of the electric machine is arranged on the crank shaft" means that the rotor is part of the crank shaft or the rotor is attached to the crank shaft. The rotor is directly attached to the crank shaft such that no coupling element has to be closed for achieving connection between the rotor and the crank shaft. Thus, the rotor and the crank shaft are suitably rotationally locked to each other. In a variant, the rotor could however be connected to the crank shaft through a gear, for example a planetary gear, where the rotor and the crank shaft are rotatable with different speed about the geometric axis.

According to one embodiment of the hybrid powertrain, the dog clutch has a sleeve displaceable in an axial direction between two positions, a neutral position where the crank shaft and the input shaft are disconnected from each other, and a drive position where the crank shaft and the input shaft are connected to each other. Hereby, a low cost design with reduced spin losses can be achieved.

For example, the dog clutch may comprise a hub arranged on the input shaft and rotationally locked relative to the input shaft, and an engagement ring rotationally locked relative to the crank shaft, wherein the sleeve is arranged on the hub and rotationally locked relative to the hub, and the sleeve and the engagement ring are engageable for connecting the crank shaft and the input shaft to each other by displacement of the sleeve. The engagement ring is preferably a dog ring or clutch cone ring.

According to another embodiment, the powertrain comprises a further electric machine connected to the transmission. By using a powerful further electric machine, a vehicle can be driven in a relatively large speed range, for example from 0 to 70-80 km/h, by means of the further electric machine, while using the internal combustion engine for charging an energy storage by means of the electric machine having the rotor arranged on the crank shaft. For higher speeds, the internal combustion engine and/or the electric machine with the rotor arranged on the crank shaft can be used for driving the vehicle.

In the same way as described for the electric machine above, the further electric machine can be an electric motor or a combined electric motor and generator.

According to a further embodiment, a rotor of the further electric machine is arranged for rotating about the geometric axis. Hereby, a compact design with improved tolerances and fewer components can be achieved.

According to a further embodiment, the transmission comprises a planetary gear set, wherein the further electric machine is connected to the input shaft of the transmission through the planetary gear set, and preferably a rotor of the further electric machine is rotationally locked to a sun gear of the planetary gear set, and a planet gear carrier of the planetary gear set is rotationally locked to the input shaft. Hereby, a very compact design with few components can be achieved.

According to a further embodiment, the transmission comprises a final drive and a drive chain or belt, wherein the input shaft of the transmission is connected to the final drive through the drive chain or belt. Hereby, a non-complicated design without any lay shaft can be achieved.

The term "drive chain or belt" used herein is meant to cover chains having chain links, particularly tooth chains, but also driving belts, particularly toothed belts.

According to a further embodiment, the transmission comprises a final drive and an intermediate shaft, wherein the input shaft of the transmission and the intermediate shaft are connected to each other, and the intermediate shaft and the final drive are connected to each other. For example, the transmission may have a gear wheel arranged on the input shaft and a gear wheel arranged on the intermediate shaft, wherein the gear wheel of the input shaft and the gear wheel of the intermediate shaft are engaged with each other, and the transmission may have a gear wheel arranged on the intermediate shaft engaged with the final drive. Hereby, a robust technology can be used for transferring the power to the final drive and the wheels of a vehicle.

According to a further embodiment, the further electric machine is connected to the intermediate shaft, for example via a gear. For example, the transmission may comprise a gear wheel arranged on a motor shaft of the further electric machine and a gear wheel arranged on the intermediate shaft, wherein the gear wheel arranged on the motor shaft and the gear wheel arranged on the intermediate shaft are engaged with each other. In addition to transfer power from the further electric machine to the final drive through the intermediate shaft, power can also be regenerated by driving the further electric machine as a generator by means of the internal combustion engine.

According to a further embodiment, the further electric machine is permanently connected to the intermediate shaft. Hereby, regeneration of energy can be performed with a small number of components.

According to a further embodiment, the powertrain has a further dog clutch arranged for connecting and disconnecting the further electric machine and the intermediate shaft to and from each other. Hereby, it is possible to disconnect the further electric machine when not used, thereby eliminating any losses associated with rotating the rotor of the further electric machine.

According to a further embodiment, the electric machine and the further electric machine are electrically connected to each other via the energy storage. By electrically connected to each other is meant that energy can be transferred between the electric machines which will increase the flexibility of the powertrain. It should however be stressed that each electric machine is suitably independently controlled. Hereby, energy can be transferred between the electric machines via the energy storage and one or both electric machines can be used both as motor and generator. In case AC electric machines are used, each machine is suitably connected to the energy storage device by means of an inverter for converting AC to DC, when charging the energy storage by the generator function of the machine, and from DC to AC, when powering the electric machine by the energy storage.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
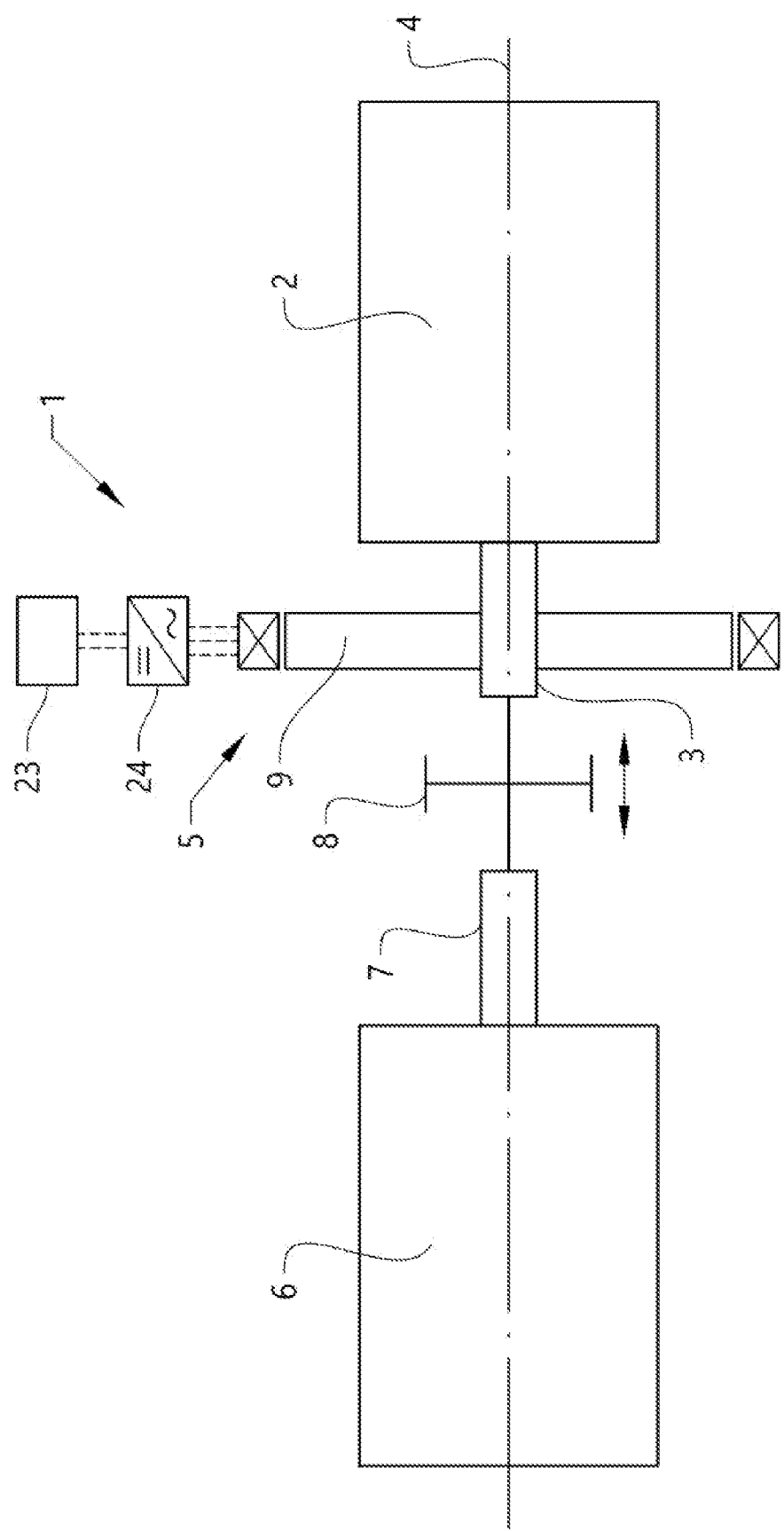
FIG. 1 is a schematic view of one example embodiment of a hybrid powertrain according to the invention.

FIG. 1 is a schematic view showing a hybrid powertrain 1 for a vehicle. The powertrain 1 comprises an internal combustion engine 2 having a crank shaft 3 rotatable about a geometric axis 4, an electric machine 5 and a transmission 6 having an input shaft 7 rotatable about the geometric axis 4. The powertrain 1 further comprises a clutch 8 by which clutch 8 the internal combustion engine 2 and the transmission 6 are selectively connectable to each other.

The internal combustion engine 2 is arranged for transferring torque to the transmission 6. The transmission 6, which suitably comprise a final drive, is arranged for transferring torque to wheels of the vehicle (not shown).

A rotor 9 of the electric machine 5 is arranged on the crank shaft 3 for rotating together with the crank shaft 3 about the geometric axis 4, and the clutch 8 is a dog clutch arranged for connecting and disconnecting the crank shaft 3 of the internal combustion engine 2 and the input shaft 7 of the transmission 6 to and from each other.

The electric machine 5 is arranged for transferring torque between the electric machine 5 and the crank shaft 3 and between the electric machine 5 and the transmission 6.

The electric machine 5 is suitably a combined electric motor and generator, though in another embodiment the electric machine 5 could be an electric motor only. The electric machine 5 can be electrically connected to an energy storage 23.

The electric machine 5 can be an AC motor/generator and then the electric machine is connected to an AC/DC inverter 24 which in turn is connected to the energy storage 23, such as a battery. The inverter 24 can be used for converting AC to DC when charging the battery 23 by the generator function of the electric machine 5, and for converting DC to AC when powering the electric machine 5 by the battery 23.

Figure 2:
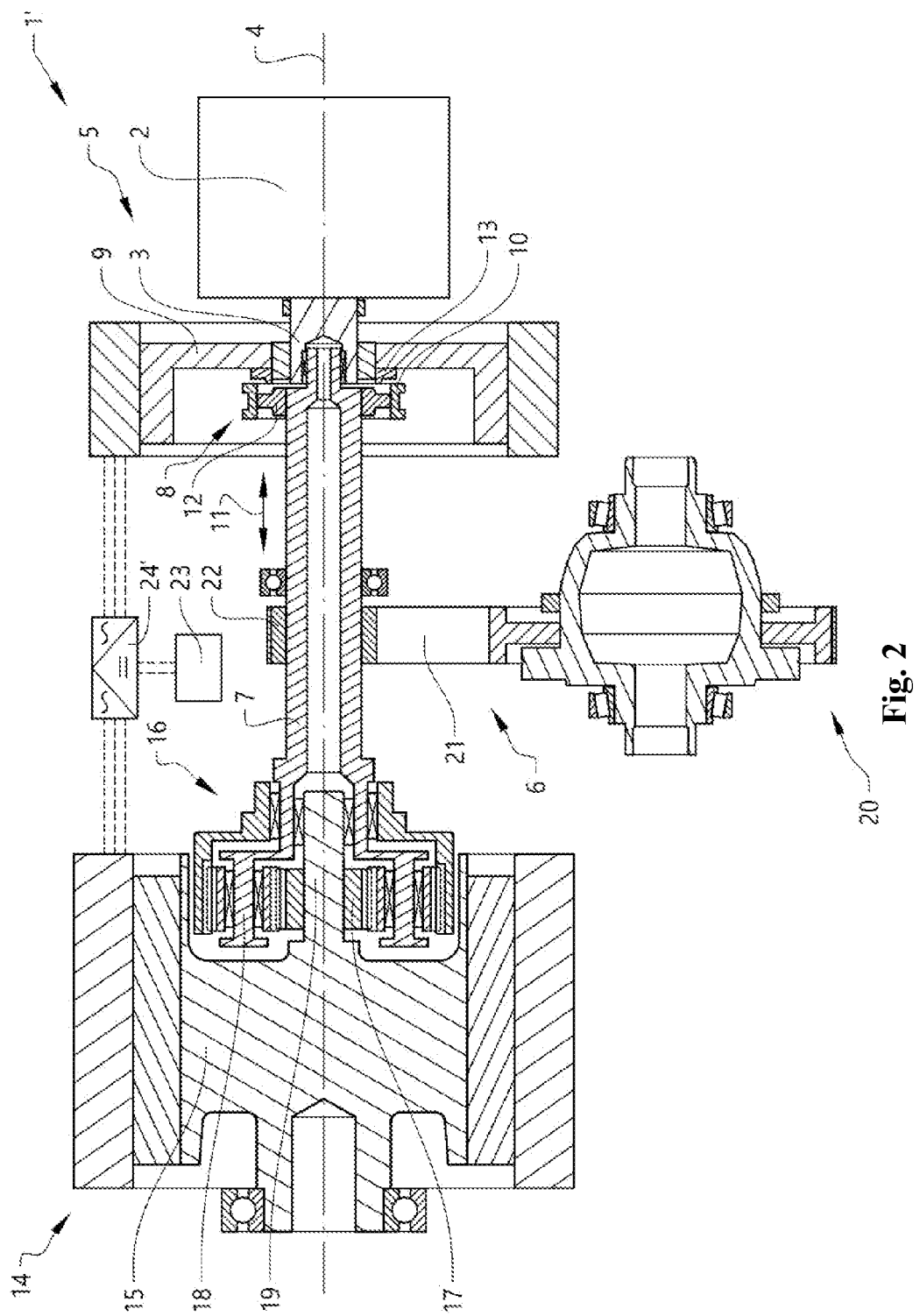
FIG. 2 shows a variant of the powertrain in FIG. 1.

FIG. 2 shows a variant of the hybrid powertrain 1'. With reference to FIG. 2, only additional or modified components as compared to the powertrain in FIG. 1 will be described in detail. The dog clutch 8 has suitably a sleeve 10 displaceable in an axial direction 11 between two positions; a neutral position (shown) where the crank shaft 3 and the input shaft 7 are disconnected from each other, and a drive position where the crank shaft 3 and the input shaft 7 are connected to each other.

The dog clutch 8 may comprise a hub 12 arranged on the input shaft 7 and rotationally locked relative to the input shaft 7, and an engagement ring 13 rotationally locked relative to the crank shaft 3. The engagement ring 13 can be directly attached to the crank shaft 3 or be attached to the rotor 9 of the electric machine 5 which in turn is rotationally locked to the crank shaft 3. The sleeve 10 is arranged on and rotationally locked to the hub 12. The sleeve 10 and the engagement ring 13 are engageable for connecting the crank shaft 3 and the input shaft 7 to each other by displacement of the sleeve 10. In FIG. 2, the sleeve 10 can be displaced to the right in the axial direction 11 for engagement with the engagement ring 13.

In this example embodiment illustrated in FIG. 2, the powertrain has a further electric machine 14. The further electric machine 14 is connected to the input shaft 7 of the transmission 6. The further electric machine 14 is suitably connected to the input shaft 7 at an opposite end thereof relative to the first electric machine 5. A rotor 15 of the further electric machine 14 is arranged for rotating about the geometric axis 4 about which also the rotor 9 of the first electric machine 5 and the crank shaft 3 are arranged to rotate.

The further electric machine 14 is arranged for transferring torque between the further electric machine 14 and the transmission 6.

The transmission 6 comprises a planetary gear set 16. The further electric machine 14 is connected to the input shaft 7 of the transmission 6 through the planetary gear set 16. The planetary gear set may have a sun gear, planet gears, a planet gear carrier and a ring gear as known by the skilled person in the art.

In the example embodiment illustrated in FIG. 2, the rotor 15 of the further electric machine 14 is rotationally locked to a sun gear 17 of the planetary gear set 16, and a planet gear carrier 18 of the planetary gear set 16 is rotationally locked to the input shaft 7. Thus, a rotation of the rotor 15 will bring the input shaft 7 to rotate, and vice versa.

For example, the rotor 15 of the further electric machine 14 can be attached to the sun gear 17 of the planetary gear set 16 by arranging the sun gear 17 onto a shaft 19 of the rotor 15. The planet gear carrier 18 of the planetary gear set 16 and the input shaft 7 can be made in one piece or by separate pieces connected to each other.

The transmission 6 further comprises a final drive 20 and a drive chain or belt 21. The input shaft 7 of the transmission 6 is connected to the final drive 20 through the drive chain or belt 21.

For an embodiment where a drive chain is used, a sprocket wheel 22 can be arranged on the input shaft 7, and a corresponding sprocket wheel or similar driven by the drive chain 21, can be arranged as final drive of the differential.

For an embodiment where a drive belt is used, a pulley can be arranged on the input shaft, and a corresponding pulley or similar driven by the drive belt, can be arranged as final drive of the differential.

In the same way as already described for the electric machine 5 with reference to FIG. 1, the further electric machine 14 is suitably a combined electric motor and generator, though in another embodiment the further electric machine could be an electric motor only. The further electric machine 14 can be electrically connected to an energy storage 23.

In the example embodiment illustrated in FIG. 2, the electric machine 5 and the further electric machine 14 are electrically connected to each other for transferring energy between the electric machines. Both the electric machine 5 and the further electric machine 14 are suitably electrically connected to the energy storage device 23. The electric machines 5, 14 can be AC motors/generators and then the electric machines are connected to an AC/DC inverter 24' which in turn is connected to the energy storage device 23, such as a battery. The inverter 24' can be used for converting AC to DC when charging the battery 23 by the generator function of the electric machine and/or the further electric machine, and for converting DC to AC when powering the electric machine 5 and/or the further electric machine 14 by the battery 23. Optionally, the inverter 24' can be replaced by two separated inverters, one inverter for each electric machine.

Figure 3:
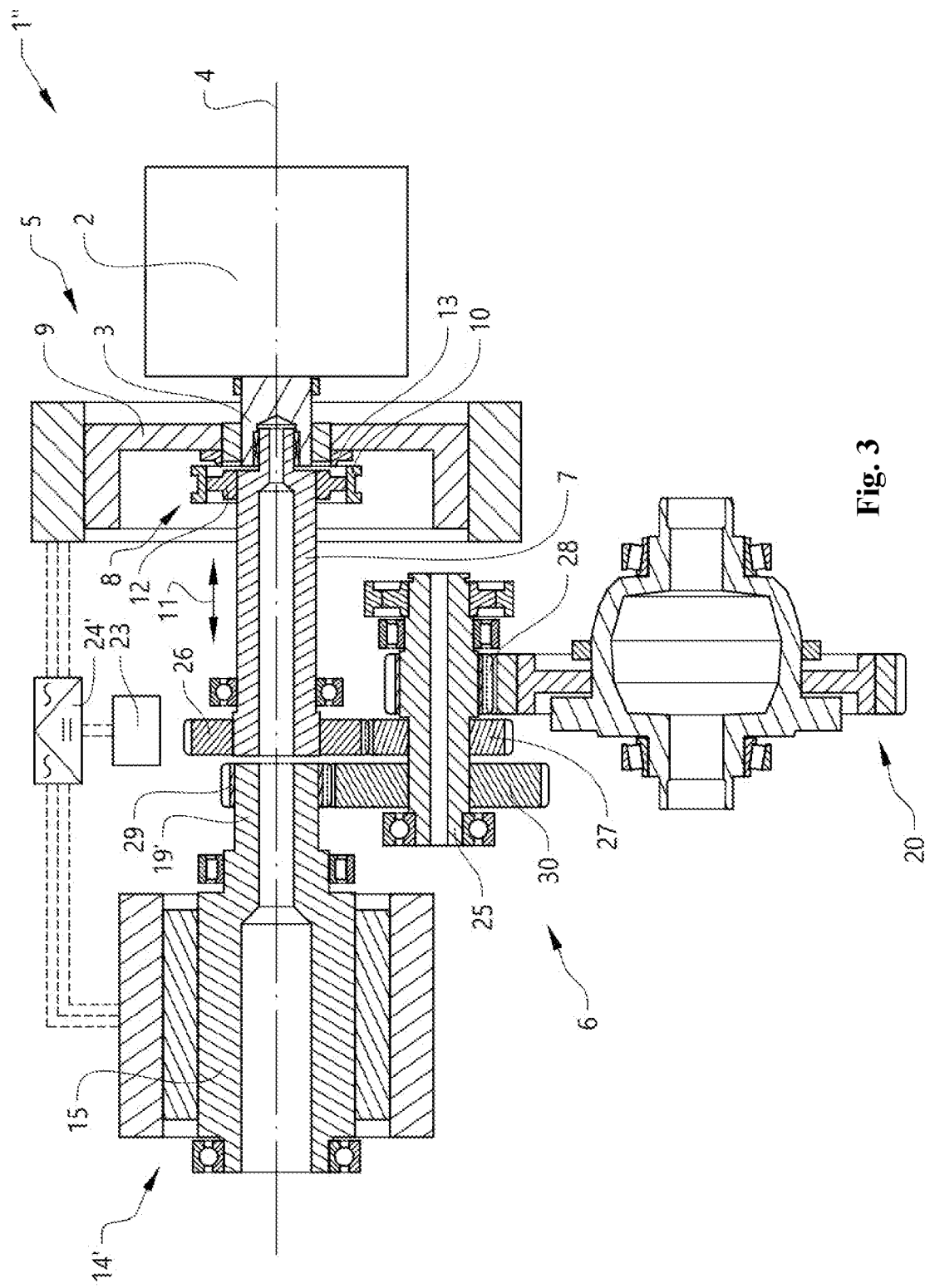
FIG. 3 shows a further variant of the powertrain in FIG. 1.

FIG. 3 shows a further variant of the powertrain 1". With reference to FIG. 3, only additional or modified components as compared to the powertrain in FIGS. 1 and 2 will be described in detail.

The transmission 6 comprises the final drive 20 and an intermediate shaft 25. The input shaft 7 of the transmission 6 and the intermediate shaft 25 are connected to each other, and the intermediate shaft 25 and the final drive 20 are connected to each other. The transmission 6 can have a gear wheel 26 arranged on the input shaft 7 and a gear wheel 27 arranged on the intermediate shaft 25. The gear wheel 26 of the input shaft 7 and the gear wheel 27 of the intermediate shaft 25 are engaged with each other. Further, the transmission 7 has a gear wheel 28, arranged on the intermediate shaft 25 and engaged with the final drive 20.

The rotor 15 of the further electric machine 14' is connected to the intermediate shaft 25 for transferring torque between the further electric machine 14' and the transmission 6. The rotor could be directly connected to the intermediate shaft 25 or connected via a gear. In the embodiment illustrated in FIG. 3, the transmission 6 comprises a gear wheel 29 arranged on a motor shaft 19' of the further electric machine 14' and a gear wheel 30 arranged on the intermediate shaft 25. The gear wheel 29 arranged on the motor shaft 19' and the gear wheel 30 arranged on the intermediate shaft 25 are engaged with each other.

Although the rotor 15 of the further electric machine 14' is arranged for rotating about the geometric axis 4 about which also the rotor 9 of the first electric machine 5 and the crank shaft 3 are arranged to rotate, in the example embodiment illustrated in FIG. 3, in another embodiment the rotor 15 of the further electric machine 14' can be arranged for rotating about an axis arranged in parallel with the geometric axis 4, but displaced relative to the geometric axis 4. Depending on conditions related to packing space and position of the further electric machine and corresponding inverter, it can be an advantage to arrange the rotation axis of the rotor 15 displaced relative to the geometric axis 4 rather than coinciding with the geometric axis 4.

Although the further electric machine 14' is permanently connected to the intermediate shaft 25 in the example embodiment illustrated in FIG. 3, the powertrain could have a further dog clutch arranged for connecting and disconnecting the further electric machine and the intermediate shaft to and from each other.

It is to be understood that the present invention is not limited to the embodiments described above and illustrated in the drawings; rather, the skilled person will recognize that many changes and modifications may be made within the scope of the appended claims.

What is claimed is:

1. A hybrid powertrain for a vehicle, the powertrain comprising:
    an internal combustion engine having a crank shaft rotatable about a geometric axis,
    an electric machine, and
    a transmission having an input shaft coaxial with the crank shaft and rotatable about the geometric axis, and a clutch by which clutch the internal combustion engine and the transmission are selectively connectable to each other,
    wherein a rotor of the electric machine is radially connected to the crank shaft for rotating together with the crank shaft about the geometric axis, and the clutch is a dog clutch arranged for connecting and disconnecting the crank shaft of the internal combustion engine and the input shaft of the transmission to and from each other,
    wherein the clutch is arranged between a gear wheel arranged on the input shaft and the electric machine,
    wherein the transmission comprises a final drive and an intermediate shaft, the input shaft of the transmission and the intermediate shaft being permanently connected to each other, and the intermediate shaft and the final drive being connected to each other,
    wherein the powertrain comprises a further electric machine having a motor shaft that is coaxial with the crank shaft and the input shaft, separate from the crank shaft and input shaft, and rotatable about the geometric axis, the motor shaft of the further electric machine being connected to the transmission and to the intermediate shaft, and wherein the shaft of the further electric machine is permanently connected to the intermediate shaft.

2. The hybrid powertrain according to claim 1, wherein the dog clutch has a sleeve displaceable in an axial direction between two positions, a neutral position where the crank shaft and the input shaft are disconnected from each other, and a drive position where the crank shaft and the input shaft are connected to each other.

3. The hybrid powertrain according to claim 2, wherein the dog clutch comprises a hub arranged on the input shaft and rotationally locked relative to the input shaft, and an engagement ring rotationally locked relative to the crank shaft, the sleeve being arranged on the hub and rotationally locked relative to the hub, the sleeve and the engagement ring being engageable for connecting the crank shaft and the input shaft to each other by displacement of the sleeve.

4. The hybrid powertrain according to claim 1, wherein the transmission comprises a gear wheel arranged on the motor shaft of the further electric machine and a gear wheel arranged on the intermediate shaft, the gear wheel arranged on the motor shaft and the gear wheel arranged on the intermediate shaft being engaged with each other.

5. The hybrid powertrain according to claim 1, wherein the transmission has the gear wheel arranged on the input shaft and a gear wheel arranged on the intermediate shaft, the gear wheel of the input shaft and the gear wheel of the intermediate shaft being engaged with each other.

6. The hybrid powertrain according to claim 1, wherein the transmission has a gear wheel arranged on the intermediate shaft engaged with the final drive.

7. The hybrid powertrain according to claim 1, wherein the input shaft of the transmission and the intermediate shaft are permanently connected to each other by the gear wheel arranged on the input shaft and a gear wheel arranged on the intermediate shaft, and wherein the shaft of the further electric machine is permanently connected to the intermediate shaft by a gear wheel arranged on the motor shaft of the further electric machine and another gear wheel arranged on the intermediate shaft.

8. A hybrid powertrain for a vehicle, the powertrain comprising:

an internal combustion engine having a crank shaft rotatable about a geometric axis, an electric machine, and a transmission having an input shaft coaxial with the crank shaft and rotatable about the geometric axis, and a clutch by which clutch the internal combustion engine and the transmission are selectively connectable to each other, wherein a rotor of the electric machine is radially connected to the crank shaft for rotating together with the crank shaft about the geometric axis, and the clutch is a dog clutch arranged for connecting and disconnecting the crank shaft of the internal combustion engine and the input shaft of the transmission to and from each other, wherein the clutch is arranged between a gear wheel arranged on the input shaft and the electric machine, wherein the transmission comprises a final drive and an intermediate shaft, the input shaft of the transmission and the intermediate shaft being permanently connected to each other by the gear wheel arranged on the input shaft and a gear wheel arranged on the intermediate shaft, and the intermediate shaft and the final drive being connected to each other, wherein the powertrain comprises a further electric machine having a motor shaft that is coaxial with the crank shaft and the input shaft, separate from the crank shaft and input shaft, and rotatable about the geometric axis, the motor shaft of the further electric machine being connected to the transmission and to the intermediate shaft, and wherein the shaft of the further electric machine is permanently connected to the intermediate shaft.

* * * * *